United States Patent [19]

Coyne

[11] 4,220,730

[45] Sep. 2, 1980

[54] CROSSLINKED CHLORINATED POLYETHYLENE FOAM

[75] Inventor: Brenton S. Coyne, Midland, Mich.

[73] Assignee: The Dow Chemical Company, Midland, Mich.

[21] Appl. No.: 951,545

[22] Filed: Oct. 16, 1978

Related U.S. Application Data

[60] Continuation-in-part of Ser. No. 784,992, Apr. 6, 1977, abandoned, which is a division of Ser. No. 713,010, Aug. 9, 1976, Pat. No. 4,146,598.

[51] Int. Cl.$^2$ .............................................. C08J 9/06
[52] U.S. Cl. .............................. 521/143; 204/159.2; 264/22; 264/51; 264/54; 264/85; 264/175; 264/176 R; 264/319; 264/DIG. 18; 521/90; 521/95; 521/145; 521/915
[58] Field of Search ................... 521/143; 204/159.2

[56] References Cited

U.S. PATENT DOCUMENTS

| | | | |
|---|---|---|---|
| 2,628,945 | 2/1953 | Wayne | 260/2.5 HA |
| 3,335,101 | 8/1967 | Kraemer, Jr. et al. | 260/2.5 HA |
| 3,491,032 | 1/1970 | Skochdopole et al. | 260/2.5 HA |
| 3,498,934 | 3/1970 | Kraemer, Jr. et al. | 260/2.5 HA |
| 3,608,006 | 9/1971 | Hosoda et al. | 260/2.5 HA |
| 3,627,658 | 12/1971 | Ryffel | 204/159.17 |
| 3,651,183 | 3/1972 | Hosoda et al. | 260/2.5 HA |
| 3,706,683 | 12/1972 | Vogt et al. | 260/2.5 HA |
| 3,709,806 | 1/1973 | Minami et al. | 260/2.5 HA |
| 3,819,543 | 6/1974 | Stastny et al. | 260/2.5 E |
| 4,011,379 | 3/1977 | Bow et al. | 204/159.17 |
| 4,012,343 | 3/1977 | Raley, Jr. | 260/2.5 HA |
| 4,146,598 | 3/1979 | Coyne | 264/22 |

*Primary Examiner*—Morton Foelak
*Attorney, Agent, or Firm*—Tai-Sam Choo

[57] ABSTRACT

A crosslinked, soft, flexible, closed-cell foam of chlorinated high density polyethylene and a process for the preparation thereof, comprising admixing a high density chlorinated polyethylene with a thermally decomposable chemical foaming agent at a temperature below the decomposition temperature of said foaming agent, molding the chlorinated high density polyethylene into desired form at a temperature below the decomposition temperature of the foaming agent, subjecting the molded chlorinated high density polyethylene to irradiation cross-linking at a temperature below the decomposition temperature of said foaming agent and contacting, in a substantially oxygen-free environment, the crosslinked chlorinated high density polyethylene with a heat transfer medium maintained at a temperature of from about 150° C. to about 350° C. for a period sufficient to form the desired product.

7 Claims, No Drawings

CROSSLINKED CHLORINATED POLYETHYLENE FOAM

CROSS REFERENCE

This application is a continuation-in-part of a division application Ser. No. 784,992, filed Apr. 6, 1977, now of abandoned, application Serial No. 713,010, filed Aug. 9, 1976, now U.S. Pat. No. 4,146,598.

BACKGROUND OF THE INVENTION

Chlorinated polyethylene foams have been known in the art for many years. Generally, such foams have been closed-cell rigid or semi-rigid polymeric structures as described in U.S. Pat. Nos. 3,335,101 and 3,498,934. Such foams have found applications in areas other than those in which soft, flexible vinyl foams are utilized. U.S. Pat. No. 3,819,543 discloses the preparation of chlorinated polyethylene foams by heating a mixture of chlorinated high pressure polyethylene, organic peroxide crosslinking agent and expanding agent. Such foams have also been found to be deficient for applications wherein soft, flexible vinyl foams are utilized.

It is, therefore, an object of the present invention to provide closed-cell, soft, flexible chlorinated polyethylene foam which may be used in applications heretofore requiring the use of soft, flexible vinyl foams.

It is another object of the present invention to provide an improved process for the making of such foam.

Other and related objects and advantages will become evident from the following specification and claims.

SUMMARY OF THE INVENTION

The above and related objects are accomplished by preparation of crosslinked, soft, flexible, closed-cell foam from a suspension chlorinated high density polyethylene having from about 25 to about 48 percent chlorine and a flexural modulus at 25° C. of less than about 15,000 psi, and preferably from about 500 to about 6000 psi, as determined by ASTM No. 790, Method 1, Procedure A. The foam is characterized by having a cell size of from about 0.05 to about 2 mm, a density of from about 2.5 to about 50 pcf, a tensile strength of from about 30 to about 600 psi, a tensile elongation of from about 200 to about 500 percent and a flexural modulus from about 500 to about 6,000 psi. The foam is prepared by a process comprising:

(a) preparing a foamable mixture consisting of the product obtained by mixing a high density suspension chlorinated polyethylene containing from about 25 to about 48 percent of chemically combined chlorine and having a flexural modulus at 25° C. of less than about 15,000 psi as determined by ASTM Test No. 790, Method 1, Procedure A, with a thermally decomposable chemical foaming agent;

(b) melt molding said foamable mixture at a temperature below that of the decomposition temperature of said chemical foaming agent, into a molded foamable article having a thickness of between about 0.025" to about 0.4";

(c) subjecting said molded foamable article while maintained at a temperature below the decomposition temperature of said foaming agent to an ionizing radiation of about 2.5 to about 7.5 mrad, for a period of time sufficient to impart crosslinking sufficient to enable said folded foamable article to retain its shape; and (d) contacting the crosslinked molded foamable article, in a substantially oxygen-free environment with a heat transfer medium maintained at a temperature between about 150° C. and about 350° C. for a period of time sufficient to form the desired flexible product.

DESCRIPTION OF THE PREFERRED EMBODIMENTS

The high density polyethylene used in the practice of the present invention as the feedstock material for resultant chlorinated polyethylene, is prepared by a catalytic process, e.g. utilizing Ziegler catalysts, which includes the production of polymers with melt indexes between about 0.1 and about 50. The density of these polymers is from about 0.948 to about 0.965. The polyethylene polymers preferred in the practice of the present invention are homopolymers of polyethylene and copolymers containing up to about 6 percent butene-1, which materials have a melt index of about 0.3 to about 6.

Any method of preparing high density polyethylene may be employed so long as the parameters of melt index and density are those as outlined herein.

The polyethylene may be chlorinated by most conventional techniques so long as a substantial portion of the chlorination occurs near the crystalline melting point of the polymer. A preferred chlorination procedure comprehends the suspension chlorination of high density polyethylene, by a procedure as set forth in U.S. Pat. No. 3,454,544, in an inert medium wherein such polymer is first chlorinated at a temperature below its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of at least about 25 percent up to about 48 weight percent, preferably from about 36 to about 45 weight percent, most preferably about 42 percent, based on the total weight of the chlorinated polymer.

The chlorinated high density polyethylene prescribed herein is used to make a rupture free, closedcell foam. In order to achieve such desired results, the polymer must exhibit an extensibility at foaming conditions measured as an $(L_b/L_o)$ at least equal to $(ER)^{2/3}$ where $$\text{Expansion ratio of foam} = ER = \frac{\text{volume of foam sheet}}{\text{volume of unfoamed sheet}}$$

$$\text{Extension ratio of polymer} = \frac{L}{b}$$

$$L_o = \frac{\text{stretch of polymer at rupture}}{\text{initial length of polymer}}.$$

To make foams of low density a high extension ratio of polymer is needed. It has been observed that the crosslinked chlorinated high density polyethylene described herein shows a high extension ratio of polymer near foaming conditions when containing a high amount of chlorine. High density polyethylene containing less than about 25% chlorine does not show high extension ratio of polymer and therefore will not produce foams of desired low density. It has also been observed that flexural modulus of the chlorinated polyethylene or foam produced therefrom increases as percent chlorine decreases. On the other end of the scale, difficulty in polymer processing is encountered when attempting to chlorinate the high density polyethylene to a degree higher than 48 percent.

The term "chemical foaming agent" as used herein, denotes a chemical which is liquid or solid at room temperature but which, upon being heated above its decomposition temperature, evolves a gas. Any chemically decomposable foaming agent can be used if it can be incorporated into the polymer without polymer degradation occurring, and if it will maintain the integrity of the resultant foam. Included are such compounds as, e.g., azobiscarbonamide, trihydrazinosymtriazine, hydrazo-dicarbonamide. A foaming agent which is suitable for the basic polymer is chosen in consideration of such as the foaming temperature, the amount of gas evolved, affinity for the base polymer, and desired density of the foam produced. It is preferred to use a foaming agent having a high decomposition temperature, such as azobiscarbonamide.

The hereinbefore described chlorinated polyethylene, and chemical foaming agent are preferably mixed by melt blending such materials. Other additives such as processing aids, plasticizers, stabilizers, color additives, etc. may be added if desired. The mixing may be by any conventional method such as by means of a Banbury mixer, kneading rolls, compounding mill, screw extruder, etc., there being no particular mixing restrictions according to the present invention, so long as a uniform mixture is achieved and there is no substantial decomposition or deterioration of the chlorinated polyethylene or chemical foaming agent. After the mixing has been thoroughly accomplished, the mixture is melt-molded into desired form. The means for forming the mixture into such form include, for example, utilization of a hot press, calender rolls or extruders.

Although not limited to molded foamable articles of any particular thickness, it has been found that a foamable article having a thickness of from about 0.025 to about 0.4 inch is best suited for the present process. This range in thickness gives adequate latitude for sufficient foaming. It should be remembered, however, that if the molded foamable article is too thin the gas of the foaming agent escapes through the article and does not permit the article to foam adequately. If on the other hand, the molded foamable article is too thick the diffusing gas will expand only the surface of the article, while leaving the core of such article unaffected by the foaming action.

The foamable article obtained, after having passed through the steps hereinabove described, is then irradiated with a high energy ionizing radiation. The term "ionizing radiation," as used herein, is a generic term for those radiations having an ionizing capacity, such as electron rays, gamma rays, X-rays, neutron rays and proton rays. Electron rays are preferred for the practice of the present invention but any one of these may be employed, and a further concurrent use of two or more of these activation sources is also permissible.

The high energy irradiation procedure in an important step in this invention. This high energy irradiation produces free radicals which combine to impart a slight degree of crosslinking of the chlorinated high density polyethylene and, as a result, to impart to it a certain degree of form retentiveness. A good foamed material is generally not obtained if the foamable article becomes completely liquefied under the heating conditions at which the foaming is to be carried out, since the gas that evolves upon decomposition of the foaming agent escapes. Further, especially in the case of a continuous process, the foamed sheet cannot be taken up on rolls. Hence, it is required that a suitable degree of crosslinking be imparted such that the sheet under the heating conditions employed can fully swell under the pressure of the gas evolved by decomposition of the foaming agent, and at the same time possess a degree of strength as will enable it to be smoothly taken up.

The application of radiation can be carried out in an atmosphere devoid of oxygen, e.g., in vacuum or nitrogen or in an atmosphere of other substantially inert gases while heating or cooling the foamable article. Such application, however, can be carried out in an air environment at ambient temperature. Whatever the case, the heat generated by application of radiation must be in a range as will not decompose the foaming agent. The dosage required of the radiation will vary depending on the makeup of the particular chlorinated high density polyethylene used and the methods of applying the radiation. Dosages which may be employed are from 1 to about 10 mrads, preferably from 2.5 to about 7.5 mrads, most preferably from 5.5–7.5 mrads.

Stress strain curves of the chlorinated polyethylene while heated to a temperature of from about 150° C. to about 350° C. reflect an increase in tensile strength with increasing radiation dose and a maximum extension ratio at rupture ($L_b/L_o$) at an optimum radiation dose with a decrease in ($L_b/L_o$) on either side. When using a radiation dose of less than 2.5 mrad the polymer has low toughness, is "soupy" and foam collapse may occur. When using a radiation dose substantially in excess of about 6 mrad, splitting begins to occur as the expanding gas stretches the polymer beyond its critical extension ratio.

Tensile strength of the chlorinated polyethylene foams of the present invention are moderate, i.e. from about 30 to about 600 psi, and ultimate elongation quite high, i.e. from about 200 to about 500 percent. Tensile strength increases and ($L_b/L_o$) decreases as radiation dose is increased.

As hereinbefore described, the foamable article obtained has a degree of crosslinking. This crosslinking does not necessarily alter the permeability of the polymer to the gas. It is theorized that such crosslinking acts to modify the visco elastic properties of the polymer to prevent cell wall disintegration via viscous flow. The article is thereby provided with a property which, upon decomposition of the foaming agent by heating, causes it to soften and form a good foamed structure.

The foamable article is contacted with or immersed in a heat transfer medium, e.g. gas or liquid, heated to a temperature above the decomposition temperature of the foaming agent which temperature is suited for effecting the three dimensional foaming and spreading out of the article. Preferably, the foamable article is placed in contact with the heat transfer medium in an atmosphere which is essentially devoid of oxygen.

The time of heating and amount of heat needed to induce expansion of the molded article will vary depending upon the composition of the chlorinated high density polyethylene and the class of foaming agent used. The heat transfer fluid should be maintained at a temperature of from about 150° C. to about 350° C., preferably from about 200° C. to about 260° C. with a temperature of about 225° C. being especially preferred.

Chlorinated high density polyethylene shows some signs of degradation by oxygen when exposed to temperature of about 220° C. in the presence of oxygen. By using the above-described foaming techniques, shorter foaming times and finer cells with whiter more stable foam is realized as a result of being shielded from oxygen.

Any conventional heat transfer medium may be used provided it is stable at the temperatures required and further provided it does not stain, degrade, or otherwise attack the formable article. A fused salt mixture of potassium nitrate and sodium nitrite is particularly preferred. Similar mixtures are disclosed in U.S. Pat. No. 3,562,367.

The salt mixture adhering to the foamed final product can be easily washed away with a solvent such as water or acetone.

The foamed product of the present invention is a predominately closed-cell structure having a cell size ranging from about 0.05 up to about 2 mm. This closed-cell structure has a tensile strength of from about 30 to about 600 psi, and a tensile elongation of from about 200 to about 500 percent.

The foamed product of the present invention has a thickness of between about 0.025" to about 0.4", preferably between about 0.075" to about 0.2".

The density of the foamed material may be varied widely depending upon its application. For most applications, however, it is not necessary, or practical, to go below the 2.5 pcf minimum nor exceed the 50 pcf maximum of the present foamed product. A density of from about 2.5 pcf to about 15 pcf is preferred, a density of from about 2.5 pcf to 8 pcf being especially preferable.

A preferred mode of operation for producing the desired foamed structures as contemplated by the present invention comprises melt blending the prescribed chlorinated polyethylene with one or more heat stabilizers. Then, after adding a thermosensitive chemical foaming agent, and other additives if necessary, the mixture is again thoroughly melt blended. The resulting melt is molded into a desired form, cooled, and is then lightly irradiation crosslinked, after which the article is placed in contact with or immersed in a heat transfer medium. After a period of time sufficient to cause complete decomposition of the foaming agent, the foamed product is removed and washed with water.

The following example is given for illustration of a specific mode of practicing the invention. Parts and percentages are by weight unless otherwise specified.

EXAMPLE I

100 Parts of a chlorinated polyethylene prepared from a high density polyethylene feedstock of 6 melt index and containing about 36% of chemically combined chlorine, was melt blended with 2 parts calcium stearate and 3 parts Drapex$^R$ 6.8 (as heat stabilizers) for two minutes on a two roll compounding mill heated to a temperature of about 120° C. A thermally decomposable foaming agent, azobisformamide was milled into the melt at a concentration of 10 parts using a milling time of three minutes. Eighty grams of the melt was placed in a 6"×6" compression mold press operating at a temperature of 125° C. A pressure of 80 psi was held on the sheet for five minutes. Platen temperature was reduced to 50° C. prior to releasing the pressure. The molded sheet was crosslinked with 5.5 mrad, 2 mev high energy scanned electrons with a beam current of 250 microamps in an air environment. The crosslinked sheet was foamed by immersing it in a heat transfer fluid comprising a fused salt mixture of potassium nitrate and sodium nitrite (50/50) maintained at a temperature of about 225° C. After a foaming time of about 110 seconds, the sample was removed and washed with water. The resulting product was a crosslinked, soft, flexible, closed-cell foam having a tensile strength of about 50 psi, a tensile elongation of from about 300–400%, a cell size of from about 0.1–0.4 mm, and a density of about 3.3 pounds per cubic foot.

This invention has been described in connection with certain specific embodiments, e.g. the polyethylene feedstock, chlorination technique and mode of crosslinking, which significantly affect the physical properties of the foamed product. It is necessary that the high density polyethylene feedstock be crystalline, linear polyethylene of fine particle size. The utilization of low density polyethylene would render a foamed product of higher rigidity. This is attributable to the fact that low density polyethylene is of a more amorphous character (than high density polyethylene), highly branched, and of larger particle size, thereby resulting in a higher polymer modulus since the low density polyethylene particles are not fine enough to chlorinate uniformly.

The chlorination procedure utilized is also of significant importance. Although most conventional techniques may be employed, it is necessary that such chlorination be carried out near the crystalline melting point of the polymer. This parameter therefore would eliminate utilization of gas phase, UV-catalyzed chlorination carried out at almost ambient conditions since such a procedure would produce a chlorinated polymer of very high modulus and a stiff foamed product when compared to those produced by the desired process.

Irradiation crosslinking is also critical to the practice of the present invention when compared to the utilization of chemical crosslinking agents, e.g. peroxide. Peroxide crosslinking limits processing parameters due to the nature of the peroxide temperature of reactivity and half-life decomposition. A chemical crosslinking package that will crosslink without interferring with polymer processing or degrading the foaming agent has not yet been found. This problem, however, is solved with irradiation crosslinking.

It is to be understood that the present description of this invention is by way of illustration and not limitation, and that the scope of the invention is defined solely by the appended claims which should be construed as broadly as is consistent with the prior art.

What is claimed is:

1. A crosslinked, soft, flexible closed-cell suspension chlorinated high density polyethylene foam derived from a chlorinated high density polyethylene having about 25 to about 48 percent chlorine and a flexural modulus of less than about 15,000 psi as determined by ASTM Test No. 790, Method 1, Procedure A, said foam having a cell size of from about 0.05 to about 2 mm, a density of from about 2.5 to about 50 pcf, a tensile strength of from about 30 to about 600 psi, and a tensile elongation of from about 200 to about 500 percent and a flexural modulus from about 500 to about 6,000 psi, said foam being prepared by a process comprising (a) preparing a foamable mixture consisting of the product obtained by mixing a high density suspension chlorinated polyethylene containing from about 25 to about 48 percent of chemically combined chlorine and having a flexural modulus at 25° C. of less than about 15,000 psi as determined by ASTM Test No. 790, Method 1, Procedure A, with a thermally decomposable chemical foaming agent;
(b) melt molding said foamable mixture at a temperature below that of the decomposition temperature of said chemical foaming agent, into a molded foamable article having a thickness of between about 0.025" to about 0.4";
(c) subjecting said molded formable article while maintained at a temperature below the decomposition temperature of said foaming agent to an ionizing radiation of about 2.5 to about 7.5 mrad, for a period of time sufficient to impart crosslinking sufficient to enable said molded foamable article to retain its shape; and
(d) contacting the crosslinked molded foamable article, in a substantially oxygen-free environment with a heat transfer medium maintained at a temperature between about 150° C. and about 350° C. for a period of time sufficient to form the desired flexible product.

2. The suspension chlorinated high density polyethylene foam of claim 1 wherein said polyethylene has from about 40 to 45 percent chlorine.

3. The suspension chlorinated high density polyethylene foam of claim 1 wherein said foam has a flexural modulus of less than about 12,000 psi.

4. The suspension chlorinated high density polyethylene foam of claim 1 wherein said foam has a thickness between about 0.075" to about 0.2".

5. The suspension chlorinated high density polyethylene foam of claim 1 wherein said foam is prepared by subjecting said molded foamable article to an ionizing radiation of about 5.5 to 7.5 mrad.

6. The suspension chlorinated high density polyethylene foam of claim 1 wherein said polyethylene has a flexural modulus from about 500 to about 6,000 psi.

7. The suspension chlorinated high density polyethylene foam of claim 1 wherein said foam has a density from about 2.5 to about 15 pcf.

* * * * *